(12) United States Patent
Stieber et al.

(10) Patent No.: US 7,053,137 B2
(45) Date of Patent: May 30, 2006

(54) AZODICARBONAMIDE TREATMENT FOR CARBON BLACK AND RUBBER COMPOUNDS

(75) Inventors: Joseph F. Stieber, Prospect, CT (US); Martin J. Hannon, Bethany, CT (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 330 days.

(21) Appl. No.: 10/358,420

(22) Filed: Feb. 4, 2003

(65) Prior Publication Data
US 2004/0152809 A1 Aug. 5, 2004

(51) Int. Cl.
C08J 3/20 (2006.01)
C08K 3/04 (2006.01)
B60C 1/00 (2006.01)

(52) U.S. Cl. .............. 523/351; 524/495; 524/496; 525/374; 152/209.4; 152/209.7

(58) Field of Classification Search .......... 524/495, 524/496; 152/209.4, 209.7; 523/351
See application file for complete search history.

(56) References Cited

U.S. PATENT DOCUMENTS

| | | | |
|---|---|---|---|
| 4,255,536 A | 3/1981 | Udipi ................ 525/314 |
| 4,751,271 A | 6/1988 | Graves ............... 525/329.3 |
| 4,761,446 A | 8/1988 | Graves et al. ........... 524/93 |
| 4,762,870 A | 8/1988 | Graves et al. ........... 524/93 |
| 4,975,497 A | 12/1990 | Tate et al. ............. 525/375 |
| 5,001,171 A | 3/1991 | Bohm et al. ........... 523/206 |
| 5,109,902 A | 5/1992 | Kobayashi ............. 152/209 |
| 5,147,477 A | 9/1992 | Mouri et al. ........... 152/209 |
| 5,351,734 A | 10/1994 | Mouri et al. ........... 152/209 |
| 5,571,350 A | 11/1996 | Teratani et al. .......... 152/209 |
| 5,753,365 A | 5/1998 | Morimoto et al. ........ 428/357 |
| 5,776,991 A | 7/1998 | Teratani ................ 521/99 |
| 5,788,786 A | 8/1998 | Yamauchi et al. ........ 152/209 |
| 5,798,009 A * | 8/1998 | Teratani ............... 152/548 |
| 6,497,261 B1 * | 12/2002 | Fukushima et al. ...... 152/209.4 |

OTHER PUBLICATIONS

Leeper et al., Improved Resilience in Butyl Rubber Through Chemical Modification, Rubber Word, vol. 135, pp. 413-428, (1956).
Walker et al., Chemical Promotion of NR and SBR, Rubber Age, vol. 90, pp. 925-931, (1962).
Graves, Benzofuroxans as Rubber Additives, Rubber Chem. Technol, vol. 66, pp. 61-72, (1993).
Yamaguchi et al., Coupling Agent Improves Properties, Rubber World, vol. 199, pp. 30-38, (1989).
Gonzalez et al., A New Carbon Black-Rubber Coupling Agent to Improve Wet Grip and Rolling Resistance of Tires, Rubber Chem. Technol, vol. 69, pp. 266-272, (1996).

* cited by examiner

Primary Examiner—Tae H. Yoon
(74) Attorney, Agent, or Firm—Daniel Reitenbach

(57) ABSTRACT

A process for producing cured rubber is disclosed wherein the process comprises:
A) mixing rubber, carbon black, and azodicarbonamide without other curative ingredients;
B) adding the remaining curative ingredients in one or more subsequent mixing steps; and then
C) curing the rubber;
whereby a cured rubber having improved hysteresis is obtained.

The cured rubber thus obtained is particularly useful in tires and tire treads.

12 Claims, No Drawings

AZODICARBONAMIDE TREATMENT FOR CARBON BLACK AND RUBBER COMPOUNDS

BACKGROUND OF THE INVENTION

1. Field of the Invention

The present invention is directed to a process for promoting the interaction between carbon black and rubber. More particularly, the present invention is directed to the use of azocarbonamide as a promoter of the interaction between carbon black and rubber.

2. Description of Related Art

Fillers, such as carbon black, are added to elastomeric compounds for a variety of reasons. They act as a low cost diluent and as reinforcing agents, giving higher-modulus, higher strength and greater wear resistance. The interaction between filler and an elastomer matrix is also very important to the enhancement of desirable properties such as hysteresis, and wear resistance. It is believed that when the interaction between the carbon black filler and the polymer matrix is increased, dynamic properties are improved. This is generally evidenced by lower hysteresis at elevated temperatures that would result in lower rolling resistance when the rubber is used to make automobile tires. Increased interaction between the polymer and filler can also result in cured rubber with lower heat build-up.

Interaction of rubber to the filler also results in changes in other properties. When rubber and carbon black interact, the amount of bound rubber increases. This is due to some of the polymer being strongly bonded to the surface of the carbon black. This is demonstrated by dissolving the uncured rubber in a good solvent, leaving the carbon black and bound polymer as a gel. In the absence of interaction, this quantity of gel will be minimal, and when interaction increases the amount of gel will increase. The increase in the amount of bound rubber gel in the uncured compound may be taken as evidence of increased interaction between the filler and polymer.

In the absence of interaction between filler and its elastomeric matrix, the filler forms a loosely bonded network within the matrix, which remains after curing. When the dynamic storage modulus, designated G', is measured in the cured rubber sample, the filler network acts to increase the modulus at low strain. As the applied strain on the rubber sample is increased, the bonds that form this filler network are broken, and it no longer contributes to the modulus. Thus, in the presence of small or low interaction between filler and the elastomer matrix, the dynamic storage modulus, G', will diminish as the applied strain is increased. This is known as the Payne Effect. As the filler to polymer matrix interaction increases, the filler-filler network should be decreased in the final cured elastomer. Thus when applied strain is increased as the dynamic measurement is made, the storage modulus, G', does not decrease as rapidly with an increase in the strain. The diminution of the Payne Effect is also taken as evidence that increased filler-polymer interaction has taken place. Another way to measure this is by the % G' Retained, which is simply the ratio of high strain/low strain, where higher is better.

Similarly, when the modulus of a cured sample is measured in simple extension, the modulus will increase as the strain increases. When a sample that has increased filler interaction to the matrix is compared to a control, the ratio of the modulus at high strain to the modulus at low strain will be higher. Thus, an increase in the ratio of the modulus at 300% extension to the modulus at 5% extension, ($M_{300}/M_5$), may be taken as evidence that additional interaction has taken place.

In the past some other chemicals have been added to rubber to improve the interaction of carbon black with the rubber matrix. N-Methyl-N,4-dinitrosoaniline was used commercially[1], but was discontinued due to concerns about toxicity. (See, Leeper et al., *Rubber World*, 135:413–28, (1956); Walker et al., *Rubber Age*, 90:925–31(1962)). N,N'-bis (2-methyl-2-nitropropyl)-1,6-diaminohexane has been reported to be useful and is being sold as Sumifine 1162. (See, Yamaguchi et al., *Rubber World*, 199:30–38(1989)). Several other materials have been proposed as being useful, but so far have not attained any commercial sigificance. Benzofurazan oxide has been suggested, but it evolves a strong undesirable odor during processing. (See, D. F. Graves, *Rubber Chem. TechnoL*, 66:61–72, (1993); and U.S. Pat. Nos. 4,751,271; 4,975,497; and 5,001,171). Para-amino-benzenesulfonyl azide has also been suggested as a carbon black promoter, but so far it is not available commercially. (See, Gonzalez et al., *Rubber Chem. Technol.* 69:266–72 (1996). Benzimidazolinones, hydroxybenzimidazole oxides and related materials have also been reported to be effective. (See, U.S. Pat. Nos. 4,761,446 and 4,762, 870).

Azodicarbonamide has been known to the rubber industry for some time. It is normally used as a chemical foaming agent for rubber and plastics, in order to obtain foamed rubber or plastic goods. In the manufacture of foamed rubber, azodicarbonamide is mixed with the uncured rubber polymer, along with curatives, antidegradants, and other auxiliary additives. The rubber is then heated to decompose the azodicarbonamide to gaseous products and initiate the curing reactions in such a way that the gases are trapped in the cured rubber as bubbles to provide a cured foamed rubber product.

Bridgestone Corporation has disclosed the use of blowing agents in tread compounds to make a tread with closed cells that gives better traction on ice and snow. The specific invention disclosed is a foamed tread with cells of a specified size and density. When azodicarbonamide was used in their examples, they added activators to bring the decomposition point down to the normal curing range.

U.S. Pat. No. 4,255,536 discloses a copolymer of a conjugated diene/monovinylarene modified by reaction with a dihydrocarbyl azodicarboxylate.

U.S. Pat. No. 5,109,902 discloses a pneumatic tire comprising a toroidal carcass, a belt composed of at least two rubberized cord layers arranged radially outside the carcass, and a tread surrounding the periphery of the belt. The tread rubber comprises a base rubber made of a foamed rubber, and a cap rubber made of a non-foam rubber. The cap rubber is arranged radially outside the base rubber.

U.S. Pat. Nos. 5,147,477 and 5,351,734 disclose a pneumatic tire which comprises a case and a tread which covers a crown portion of the case. The tread includes a foamed rubber which has a volume not less than 10% of that of the entire of the tread, and the foamed rubber is formed of a rubber composition which contains rubber components each having a glass transition point not higher than −60° C.

U.S. Pat. No. 5,571,350 discloses a pneumatic tire for all seasons comprising a tread provided with a foamed rubber containing a given amount of a particular resin such as crystalline syndiotactic 1,2-polybutadiene having specified hardness and average particle size, and having specified expansion ratio, average expanded cell size and storage modulus (E') at −20° C. of a given range, and said to exhibit satisfactory braking and traction performances at not only dry-on-ice state but also wet-on-ice state while sufficiently holding the steering stability, durability and low fuel consumption in summer season.

U.S. Pat. No. 5,753,365 discloses a rubber composition including a rubber component and particulates of a crystalline syndiotactic-1,2-polybutadiene resin dispersed therein. The particulates have an average particle diameter of 1 to 500 μm, and the melting point of the crystalline syndiotactic-1,2-polybutadiene resin is not less than 110° C. The compounding ratio of the resin is 5 to 60 parts by weight relative to 100 parts by weight of the rubber component. The rubber composition is said to be useful for tires, other rubber articles, etc. With respect to tires in particular, a pneumatic tire includes a rubber composition used for a tread, wherein the rubber composition includes a rubber component and particulates of crystalline syndiotactic-1,2-polybutadiene resin. The matrix portion of the tread rubber other than the above particulates is preferably a foamed rubber.

U.S. Pat. No. 5,776,991 discloses a foamed rubber composition for pneumatic tires comprising at least one diene polymer as a rubber ingredient and includes closed cells in a matrix rubber, each of these cells being covered with a coat layer made from a given amount of a resin or resin composite having a JIS-C hardness of not less than 75, a particle size of 10–200 μm and a reacted conjugate diene unit content of not less than 10% by weight. In the production of the foamed rubber composition, the melting point or glass transition point of the resin or resin composite is restricted to at least 5° C. lower than the vulcanizing temperature.

U.S. Pat. No. 5,788,786 discloses a pneumatic tire in which a foamed rubber layer having closed cells is provided at a surface of a tire tread which substantially contacts at least a road surface, wherein the foamed rubber layer has closed cells whose average diameter is about 1 m to about 120 m and has an expansion ratio of about 1% to about 100%, a solid-phase rubber portion of the foamed rubber layer has a rubber composition in which at least both of a diene-type rubber and silica are mixed, and an amount of the silica is about 10 to about 80 parts by weight based on 100 parts by weight of the diene-type rubber. The pneumatic tire is said to exhibit excellent traction and braking abilities and controllability on snowy, icy and wet road surfaces.

U.S. Pat. No. 5,798,009 discloses a foamed rubber composition for tire comprising a particular amount of particles having specified hardness and average particle size and containing aluminum-bonded hydroxy group and/or silicon-bonded hydroxy group at its surface, and a particular amount of at least one specified silane coupling agent, and is said to develop excellent performances on ice. Further, pneumatic tires contain the foamed rubber composition as a tread rubber.

SUMMARY OF THE INVENTION

It has now been found that azodicarbonamide can promote interaction between the rubber polymer and carbon black in unsaturated rubber compounds. As a result of the interaction, the dynamic properties of the rubber, such as the reduction of hysteresis, are improved.

More particularly, the present invention is directed to a process for producing cured rubber with improved hysteresis comprising mixing rubber, carbon black, and azodicarbonamide without other curative ingredients, then adding the remaining curative ingredients in subsequent mixing steps and curing the rubber.

In another embodiment, the present invention is directed to an article of manufacture comprising a cured rubber produced by a process comprising:
A) mixing rubber, carbon black, and azodicarbonamide without other curative ingredients;
B) adding the remaining curative ingredients in one or more subsequent mixing steps; and then
C) curing the rubber.

It is preferred that the article be a tire or a tire tread. Where the azodicarbonamide is used in a tire tread, it is preferably employed at a concentration of 0.1 to 20 phr in the tread compound.

DESCRIPTION OF THE PREFERRED EMBODIMENTS

As noted above, azodicarbonamide promotes an interaction between the rubber polymer and carbon black in unsaturated rubber compounds, and, as a result of the interaction, the dynamic properties of the rubber are improved.

The interaction can be brought about by mixing the azodicarbonamide with the rubber and carbon black in the first step of the rubber production process, at an elevated temperature. Alternatively, the rubber and carbon black can be mixed in a first step and the azodicarbonamide added in a second step. Other compounding ingredients, such as extending oil, or wax may be present during this mixing step, but the presence of vulcanizing agents or other curatives must be avoided. In particular, chemicals known to activate the decomposition of azodicarbonamide must not be added during the same mixing step with the azodicarbonamide. Zinc oxide and other zinc compounds, which are normally added to complement the vulcanization system should not be added in the same mix step with azodicarbonamide, as they are known to activate its decomposition. They may, however, be added in a subsequent lower temperature mixing step.

As also mentioned above, in the manufacture of foamed rubber as known in the art, azodicarbonamide is mixed with the uncured rubber polymer, along with curatives, anti-degradants, and other auxiliary additives. The rubber is then heated to decompose the azodicarbonamide to gaseous products and initiate the curing reactions in such a way that the gases are trapped in the cured rubber as bubbles to provide a cured foamed rubber product.

In light of this usual function for azodicarbonamide, it was surprising to find that by employing certain mixing procedures, it could be used to promote an interaction between the rubber polymer and carbon black filler in the cured rubber compound, without the formation of bubbles or cellular structure.

In order to realize the benefits of azodicarbonamide as a promoter for the interaction of carbon black with rubber, the azodicarbonamide must either be added to the rubber in the same mixing step as the carbon black or added in a second step to the rubber/carbon black mixture prior to the addition of vulcanizing agents or other curatives. If the azodicarbonamide is added in a later step, the improvement in dynamic properties will not be obtained, or will be distinctly reduced. Also, the full extent of the desired improvement will not be realized if the azodicarbonamide is mixed with the rubber in a mixing step prior to the incorporation of the carbon black filler.

It is also necessary to attain a certain minimal temperature, about 320° F. (160° C.), during the mixing of the rubber, carbon black, and azodicarbonamide. To obtain the best results, this temperature should be maintained while mixing for at least three minutes. An improvement in dynamic properties can be realized by simply allowing the batch to reach this temperature, but the greatest benefit will result if the batch is mixed at the high temperature for at least three minutes.

Once mixed, the rubber compound may placed in a mold and cured by heating in the normal manner for rubber goods. The curing process is not accompanied by the formation of gas bubbles or cells in the final product. This was confirmed by examination under magnification and by the measurement of the density of the final cured rubber. Also, the density of the cured rubber containing azodicarbonamide mixed according to the method of this invention was not substantially lower than that obtained from a similar recipe containing no azodicarbonamide. This indicated that there were no voids or bubbles present in the final cured rubber.

The azodicarbonamide may be used to improve the dynamic properties of many different kinds of rubber. The rubber may be a single polymer, or a blend of different polymers. Examples of the different polymers that may be used are: emulsion polymerized styrene-butadiene rubber, solution polymerized styrene-butadiene rubber, polybutadiene, natural rubber, polyisobutylene, and polyisoprene. The invention has been particularly tested with solution polymerized styrene-butadiene rubber with medium to high vinyl groups. It is preferred that the azodicarbonamide be employed at a concentration of from about 0.1 to about 20 phr in the rubber polymer, more preferably at a concentration of from about 0.1 to about 10 phr.

The carbon blacks suited for use with the azodicarbonamide are those normally used in elastomeric compounds. These are carbon blacks with Nitrogen Surface Areas of 10–250 $10^3$ $m^2/kg$, as determined by ASTM D4820. The structure or DBPA Number of the black should measure from 10–250×$10^{-5}$ $m^3/kg$ by ASTM D2414. It is preferred that the carbon black be employed at a concentration of from about 30 to about 150 parts per hundred of rubber.

EXAMPLES

Formulations and Materials:

The raw materials used in the following examples are all obtained from commercial sources.

The SBR used is Solflex 1216, solution polymerized styrene-butadiene rubber produced by Goodyear Polymers. The styrene content is 12%, the vinyl content is 46% and the $T_g$ is −45° C.

The BR used is Budene 1207, polybutadiene rubber produced by Goodyear.

The carbon blacks used were produced by Engineered Carbons Inc.

The oil used is Sundex 8125, aromatic processing oil produced by Sun Oil.

The azodicarbonamide used was Celogen® AZ 130, produced by the Uniroyal Chemical Co.

Zinc Oxide, produced by the Zinc Corporation of America.

Stearic acid, produced by Monson Chemical.

The 6PPD used is Flexzone 7P, a trademark of the Uniroyal Chemical Company for N-(1,3-dimethylbutyl) -N'-phenyl-p-phenylenediamine.

The wax is Bowax 615, microcrystalline wax produced by IGI Boler Inc.

The TBBS is Delac NS, a trademark of the Uniroyal Chemical Company for N-tert-butyl-2-benzothiazolylsulfenamide, (TBBS).

Sulfur 21-10 is produced by Georgia Gulf

A general mixing procedure is given below:

First Pass:

The rubber, carbon black, azodicarbonamide, and processing oil are charged to a laboratory internal mixer and mixed for 1.5 minutes. Alternatively, the rubber and carbon black could be mixed prior to the addition of the azodicarbonamide. The ram is raised and a sweep performed. The ram is lowered and mixing continued until a designated temperature is reached. The materials are then mixed for a predetermined time at the designated temperature and then discharged as a first masterbatch.

Second Pass:

The first masterbatch, mixed in the first pass, is charged to the mixer. Stearic acid, zinc oxide, antiozonant, and wax are added. These ingredients are added in a second pass to avoid possible interference with the promoting process. The materials are mixed for one minute, then the ram is raised and a sweep performed. The ram is lowered and mixing continued until the batch reaches an internal temperature of 138° C., or for a maximum of 5 minutes, thereby producing a second masterbatch.

Third Pass:

The second masterbatch, produced in the second pass, is charged to the mixer. The curatives, sulfur, and accelerators, are added. The materials are mixed for one minute, then the ram is raised and a sweep performed. The ram is lowered and mixing continued until the batch reaches an internal temperature of 104° C.

Materials for the examples were mixed in a Farrel BR1600 internal mixer, with a volume of 1.6 liters. The curing properties were determined on a Model ODR 2000 oscillating disc rheometer. The dynamic properties were determined at 60° C. and 10 Hz over a strain range of 0.2 to 14% single strain amplitude using a Model RPA 2000 Rubber Process Analyzer.

Standard ASTM test methods were used for measurement of Mooney viscosity (D3346-90), ODR cure characteristics (D2084-92), stress-strain (D412-92), and Shore A hardness (D2240-91).

The advantages and the important features of the present invention will be more apparent from the following examples.

Example 1

This example demonstrates the use of azodicarbonamide in reducing hysteresis and the benefit of mixing it with rubber and carbon black in a separate mixing step. A comparison of compounds B and D demonstrates that the greatest reduction in hysteresis is obtained when the azo compound is added along with the carbon black and that adding the carbon in a separate step after the incorporation of the azo compound not only produces less reduction in hysteresis, but also reduces scorch safety. A comparison of compounds B and C shows that the presence of other compounding ingredients in the same mixing step along with the carbon and the azo compound produces a final rubber vulcanizate with higher hysteresis than that produced when the rubber, carbon, and azo compound are mixed without other compounding ingredients.

|  | A | B | C | D |
|---|---|---|---|---|
| SBR | 75.00 | 75.00 | 75.00 | 75.00 |
| BR | 25.00 | 25.00 | 25.00 | 25.00 |
| N234 Carbon Black | 72.00 | 72.00 | 72.00 | 0.00 |
| Oil | 32.50 | 32.50 | 32.50 | 0.00 |
| Azodicarbonamide | 0.00 | 3.00 | 3.00 | 3.00 |
| Zinc Oxide | 0.00 | 0.00 | 2.50 | 0.00 |
| Stearic Acid | 0.00 | 0.00 | 1.00 | 0.00 |
| 6PPD | 0.00 | 0.00 | 2.00 | 0.00 |
| Wax | 0.00 | 0.00 | 1.50 | 0.00 |
| TOTAL MB-1 | 204.50 | 207.50 | 214.50 | 103.00 |

Mixing Note: MB-A Bring temperature up to 320 F. and discharge
MB B-D Bring temperature up to 320 F., hold 5 min. and discharge.

|  | A | B | C | D |
|---|---|---|---|---|
| MB-1 | 204.50 | 207.50 |  | 103.00 |
| N234 Carbon Black | 0.00 | 0.00 |  | 72.0 |
| Oil | 0.00 | 0.00 |  | 32.5 |
| Zinc Oxide | 2.50 | 2.50 |  | 2.50 |
| Stearic Acid | 1.00 | 1.00 |  | 1.00 |
| 6PPD | 2.00 | 2.00 |  | 2.00 |
| Wax | 1.50 | 1.50 |  | 1.50 |
| TOTAL MB-2 | 211.5 | 214.5 |  | 214.5 |

Mixing Note: A - B Bring temperature up to 280 F. and discharge.
D - Bring temperature up to 300 F. and discharge.

|  | A | B | C | D |
|---|---|---|---|---|
| MB-2 | 211.50 | 214.50 | 0.00 | 214.50 |
| MB-1 | 0.00 | 0.00 | 214.50 | 0.00 |
| TBBS | 1.50 | 1.50 | 1.50 | 1.50 |
| Sulfur 21-10 | 2.00 | 2.00 | 2.00 | 2.00 |
| TOTAL | 215.00 | 218.00 | 218.00 | 218.00 |

Mixing Note: Bring temperature up to 220 F. and discharge.

Rheometer - ODR 2000 @ 160 C.

|  | A | B | C | D |
|---|---|---|---|---|
| ML, Nm | 0.91 | 1.1 | 1.0 | 0.95 |
| MH, Nm | 4.33 | 4.80 | 4.6 | 4.78 |
| ts2, Minutes | 4.9 | 5.7 | 5.4 | 3.6 |
| t50, Minutes | 7.7 | 13.1 | 11.8 | 11.9 |
| t90, Minutes | 11.2 | 19.1 | 16.9 | 17.9 |

Mooney Scorch MS @ 135 C.

|  | A | B | C | D |
|---|---|---|---|---|
| t3, Minutes | 14' | 23' | 18' | 9' |
| Mooney Viscosity ML 1' + 4' @ 100 C. | 76 | 79 | 79 | 78 |

Stress/Strain

|  | A | B | C | D |
|---|---|---|---|---|
| Cure Time @ 160 C., Min. | 15 | 25 | 25 | 25 |
| 100% Modulus, MPa | 2.4 | 3.6 | 3.7 | 3.7 |
| 300% Modulus, MPa | 11.2 |  | 17.1 | 16.2 |
| Tensile, MPa | 18.8 | 16.8 | 17.6 | 18.7 |
| % Elongation | 460 | 280 | 300 | 330 |
| Hardness, Shore A | 64 | 65 | 67 | 67 |

Tan Delta

RPA 2000 @ 60 C., 10 Hz

| % Strain | A | B | C | D |
|---|---|---|---|---|
| 0.7 | 0.154 | 0.112 | 0.127 | 0.134 |
| 1 | 0.177 | 0.141 | 0.148 | 0.163 |
| 2 | 0.242 | 0.177 | 0.199 | 0.219 |
| 5 | 0.276 | 0.211 | 0.226 | 0.250 |
| 7 | 0.281 | 0.208 | 0.224 | 0.249 |
| 14 | 0.267 | 0.199 | 0.216 | 0.237 |

G'kPa

| % Strain | A | B | C | D |
|---|---|---|---|---|
| 0.7 | 6105 | 4705 | 5463 | 7360 |
| 1 | 5447 | 4321 | 4924 | 6530 |
| 2 | 3967 | 3464 | 3766 | 4895 |
| 5 | 2543 | 2526 | 2683 | 3209 |
| 7 | 2214 | 2279 | 2381 | 2802 |
| 14 | 1659 | 1839 | 1864 | 2093 |

Example 2

This example demonstrates that the rubber, carbon black, and azo compound should be mixed at least three minutes to obtain the full benefit of the addition of the azo compound. Although the compounds may be mixed for longer times, there is no benefit to be gained.

|  | A | B | C | D | E | F | G |
|---|---|---|---|---|---|---|---|
| SBR | 75.00 | 75.00 | 75.00 | 75.00 | 75.00 | 75.00 | 75.00 |
| BR | 25.00 | 25.00 | 25.00 | 25.00 | 25.00 | 25.00 | 25.00 |
| N234 Carbon Black | 72.00 | 72.00 | 72.00 | 72.00 | 72.00 | 72.00 | 72.00 |
| Oil | 32.50 | 32.50 | 32.50 | 32.50 | 32.50 | 32.50 | 32.50 |
| Azodicarbonamide | 0.00 | 3.00 | 3.00 | 3.00 | 3.00 | 3.00 | 3.00 |
| TOTAL | 204.50 | 207.50 | 207.50 | 207.50 | 207.50 | 207.50 | 207.50 |

Mixing:
A - Bring temperature up to 320 F. and discharge.
B - Bring temperature up to 320 F., hold 5 min. and discharge.
C - Bring temperature up to 320 F., hold 4 min. and discharge.
D - Bring temperature up to 320 F., hold 3 min. and discharge.
E - Bring temperature up to 320 F., hold 2 min. and discharge.
F - Bring temperature up to 320 F., hold 1 min. and discharge.
G - Bring temperature up to 320 F., and discharge.

|  | A | B | C | D | E | F | G |
|---|---|---|---|---|---|---|---|
| MB-1 | 204.50 | 207.50 | 207.50 | 207.50 | 207.50 | 207.50 | 207.50 |
| Zinc Oxide | 2.50 | 2.50 | 2.50 | 2.50 | 2.50 | 2.50 | 2.50 |
| Stearic Acid | 1.00 | 1.00 | 1.00 | 1.00 | 1.00 | 1.00 | 1.00 |
| 6PPD | 2.00 | 2.00 | 2.00 | 2.00 | 2.00 | 2.00 | 2.00 |
| Wax | 1.50 | 1.50 | 1.50 | 1.50 | 1.50 | 1.50 | 1.50 |
| TOTAL | 211.50 | 214.50 | 214.50 | 214.50 | 214.50 | 214.50 | 214.50 |
| MB-2 | 211.50 | 214.50 | 214.50 | 214.50 | 214.50 | 214.50 | 214.50 |
| TBBS | 1.50 | 1.50 | 1.50 | 1.50 | 1.50 | 1.50 | 1.50 |
| Sulfur 21-10 | 2.00 | 2.00 | 2.00 | 2.00 | 2.00 | 2.00 | 2.00 |
| TOTAL | 215.00 | 218.00 | 218.00 | 218.00 | 218.00 | 218.00 | 218.00 |
| Mix Time | 0 min. | 5 min. | 4 min. | 3 min. | 2 min. | 1 min. | 0 min. |
| Rheometer-MDR 2000 @ 160 C. | | | | | | | |
| ML, Nm | 0.35 | 0.31 | 0.30 | 0.32 | 0.32 | 0.30 | 0.32 |
| MH, Nm | 2.1 | 2.3 | 2.3 | 2.4 | 2.4 | 2.4 | 2.4 |
| ts2 | 5.1 | 6.5 | 5.7 | 5.3 | 5.0 | 5.2 | 5.1 |
| t50 | 7.1 | 12.4 | 12.2 | 12.4 | 12.2 | 12.4 | 12.3 |
| t90 | 10.2 | 17.8 | 18.4 | 18.3 | 18.1 | 18.4 | 18.3 |
| Stress/Strain | | | | | | | |
| Cure times @ 160 C. | 15' | 25' | 25' | 25' | 25' | 25' | 25' |
| 100% Mod. MPa | 2.5 | 3.6 | 3.6 | 3.5 | 3.6 | 3.8 | 3.5 |
| 300% Mod. MPa | 12.1 | | 16.3 | | | 18.1 | 17.2 |
| Tensile MPa | 20.8 | 16.5 | 16.3 | 16.8 | 17.0 | 18.8 | 18.5 |
| % Elongation | 460 | 260 | 280 | 280 | 290 | 310 | 310 |
| Hardness Shore A | 65 | 65 | 66 | 65 | 67 | 68 | 68 |
| Mooney Viscosity ML 1' + 4' @ 100 C. | 87 | 78 | 80 | 80 | 80 | 78 | 81 |
| Mooney Scorch MS @ 135 C. | | | | | | | |
| t3 | 20' | 25' | 25' | 24' | 22' | 22' | 19' |
| TAN D | | | | | | | |
| RPA 2000 @ 60 C., 10 Hz | | | | | | | |
| % Strain | | | | | | | |
| 0.7 | 0.139 | 0.104 | 0.103 | 0.104 | 0.104 | 0.103 | 0.105 |
| 1 | 0.160 | 0.129 | 0.119 | 0.126 | 0.129 | 0.129 | 0.134 |
| 2 | 0.221 | 0.174 | 0.169 | 0.173 | 0.182 | 0.192 | 0.188 |
| 5 | 0.268 | 0.211 | 0.213 | 0.213 | 0.220 | 0.228 | 0.236 |
| 7 | 0.261 | 0.207 | 0.204 | 0.208 | 0.217 | 0.223 | 0.235 |
| 14 | 0.247 | 0.197 | 0.191 | 0.196 | 0.204 | 0.208 | 0.219 |
| G'kPa | | | | | | | |
| % Strain | | | | | | | |
| 0.7 | 5960 | 4613 | 4667 | 5019 | 5463 | 5929 | 6327 |
| 1 | 5405 | 4290 | 4328 | 4525 | 5049 | 5323 | 5722 |
| 2 | 4003 | 3451 | 3476 | 3642 | 3902 | 4066 | 4440 |
| 5 | 2529 | 2435 | 2396 | 2582 | 2722 | 2801 | 2902 |
| 7 | 2244 | 2215 | 2235 | 2311 | 2405 | 2494 | 2555 |
| 14 | 1768 | 1789 | 1841 | 1882 | 1946 | 1990 | 2050 |

In view of the many changes and modifications that can be made without departing from principles underlying the invention, reference should be made to the appended claims for an understanding of the scope of the protection to be afforded the invention.

What is claimed is:

1. A process for producing cured rubber comprising:
   A) mixing rubber, carbon black, and azodicarbonamide without curative ingredients;
   B) adding curative ingredients in one or more subsequent mixing steps; and then
   C) curing the rubber;
   whereby a cured rubber having improved hysteresis is obtained.

2. The process of claim 1 wherein the rubber, carbon black, and azodicarbonamide are mixed for an extended time at a temperature above about 160° C. for a time sufficient to achieve maximum interaction of filler and polymer.

3. The process of claim 2 wherein the mixing time is at least three minutes.

4. The process of claim 1 wherein the rubber and carbon black are mixed in a first mixing step and then the azodicarbonamide is added in a second mixing step.

5. The process of claim 1 wherein the rubber, carbon black, and azodicarbonamide are mixed simultaneously in a single step.

6. The process of claim 1 wherein the azodicarbonamide is present at a concentration of from about 0.1 to about 20 phr in the rubber polymer.

7. The process of claim 1 wherein the rubber is selected from the group consisting of solution polymerized styrene-butadiene rubber, emulsion polymerized styrene-butadiene rubber, natural rubber, polybutadiene rubber, polyisoprene rubber, polyisobutylene rubber, ethylene-propylene-diene terpolymer rubber, and blends of two or more of the foregoing.

8. The process of claim 1 in which the carbon black is used at a level of 30–150 parts per hundred of rubber.

9. An article of manufacture comprising a cured rubber produced by a process comprising:
   A) mixing rubber, carbon black, and azodicarbonamide without curative ingredients;
   B) adding curative ingredients in one or more subsequent mixing steps; and then
   C) curing the rubber.

10. The article of manufacture of claim 9 wherein the article is a tire tread.

11. The article of manufacture of claim 10 wherein the azodicarbonamide is present at a concentration of 0.1 to 20 phr in the tread compound.

12. The article of manufacture of claim 9 wherein the article is a tire.

* * * * *